United States Patent
Kamada et al.

(10) Patent No.: US 11,579,816 B2
(45) Date of Patent: Feb. 14, 2023

(54) PRINTING CONDITION SETTING METHOD, PRINTING CONDITION SETTING SYSTEM

(71) Applicant: SEIKO EPSON CORPORATION, Tokyo (JP)

(72) Inventors: Takahiro Kamada, Nagano (JP); Satoru Ono, Nagano (JP); Yuko Yamamoto, Nagano (JP); Ryoki Watanabe, Nagano (JP); Mitsuhiro Yamashita, Nagano (JP); Kenji Matsuzaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/645,069

(22) Filed: Dec. 20, 2021

(65) Prior Publication Data
US 2022/0197572 A1  Jun. 23, 2022

(30) Foreign Application Priority Data

Dec. 22, 2020 (JP) .............................. JP2020-212192
Mar. 22, 2021 (JP) .............................. JP2021-046968

(51) Int. Cl.
*G06F 3/12* (2006.01)
*G06K 15/10* (2006.01)

(52) U.S. Cl.
CPC .......... *G06F 3/1205* (2013.01); *G06F 3/1256* (2013.01); *G06F 3/1257* (2013.01)

(58) Field of Classification Search
CPC .... G06F 3/1205; G06F 3/1256; G06F 3/1257; G06N 3/0454
See application file for complete search history.

(56) References Cited

U.S. PATENT DOCUMENTS

| | | | |
|---|---|---|---|
| 5,393,149 A | 2/1995 | Iima | |
| 2005/0156984 A1 | 7/2005 | Uejima et al. | |
| 2005/0190236 A1 | 9/2005 | Ishimoto | |
| 2020/0210780 A1* | 7/2020 | Torres | G06F 16/783 |
| 2021/0114368 A1* | 4/2021 | Ukishima | B41J 29/393 |
| 2021/0173596 A1* | 6/2021 | Matsushita | G06F 3/1219 |
| 2021/0192299 A1* | 6/2021 | Uemura | G06N 20/00 |

FOREIGN PATENT DOCUMENTS

| | | |
|---|---|---|
| JP | H05-294039 A | 11/1993 |
| JP | 2003-251824 A | 9/2003 |
| JP | 2005-231356 A | 9/2005 |
| JP | 2005-244896 A | 9/2005 |
| JP | 2015-044380 A | 3/2015 |
| JP | 2017-074741 A | 4/2017 |

\* cited by examiner

*Primary Examiner* — Iriana Cruz
(74) *Attorney, Agent, or Firm* — Global IP Counselors, LLP

(57) ABSTRACT

A printing condition setting method is a printing condition setting method of setting printing conditions in a printing apparatus, including a learning step of performing machine learning by using ink physical characteristics and ink type information, a similarity score calculation step of calculating a similarity score indicating a similarity of a use ink used for printing in the printing apparatus with respect to a learned ink learned in the learning step, and a printing condition setting step of setting the printing conditions according to the use ink based on the similarity score.

8 Claims, 12 Drawing Sheets

FIG. 7

| INK TYPE | PRINTING CONDITIONS (CONTROL PARAMETERS) | | | | | |
|---|---|---|---|---|---|---|
| | PLATEN TEMPERATURE | HEATER TEMPERATURE | CRIMPING PRESSURE | HEAD SCANNING SPEED | HEAD DRIVE VOLTAGE | AMOUNT OF HEAT |
| A | PT1 | HT1 | PP1 | HP1 | HV1 | HQ1 |
| B | PT2 | HT2 | PP2 | HP2 | HV2 | HQ2 |
| C | PT3 | HT3 | PP3 | HP3 | HV3 | HQ3 |
| D | PT4 | HT4 | PP4 | HP4 | HV4 | HQ4 |
| E | PT5 | HT5 | PP5 | HP5 | HV5 | HQ5 |
| F | PT6 | HT6 | PP6 | HP6 | HV6 | HQ6 |
| G | PT7 | HT7 | PP7 | HP7 | HV7 | HQ7 |

| INK TYPE | A | B | C | D | E | F | G | H | I | J | K | L | M | N |
|---|---|---|---|---|---|---|---|---|---|---|---|---|---|---|
| SIMILARITY SCORE | 0.1 | 0.9 | -0.2 | 0.4 | -0.1 | -0.6 | -0.3 | 0.3 | 0.6 | -0.5 | 0.2 | 0.8 | -0.5 | 0.7 |

| INK TYPE | A | B | C | D | E | F | G | H | I | J | K | L | M | N |
|---|---|---|---|---|---|---|---|---|---|---|---|---|---|---|
| SIMILARITY SCORE | 0.5 | 0.0 | -1.0 | -0.4 | 0.4 | 0.2 | 0.3 | 0.0 | 0.5 | 0.6 | 0.25 | -0.8 | -0.1 | 0.4 |

FIG. 13

| PRINTING APPARATUS A | INK TYPE | PRINTING CONDITIONS (CONTROL PARAMETERS) |||||
|---|---|---|---|---|---|---|
| | | PLATEN TEMPERATURE | HEATER TEMPERATURE | CRIMPING PRESSURE | HEAD SCANNING SPEED | HEAD DRIVE VOLTAGE | AMOUNT OF HEAT |
| | A | PT1 | HT1 | PP1 | HP1 | HV1 | HQ1 |
| | B | PT2 | HT2 | PP2 | HP2 | HV2 | HQ2 |
| | C | PT3 | HT3 | PP3 | HP3 | HV3 | HQ3 |
| | D | PT4 | HT4 | PP4 | HP4 | HV4 | HQ4 |
| | E | PT5 | HT5 | PP5 | HP5 | HV5 | HQ5 |
| | F | PT6 | HT6 | PP6 | HP6 | HV6 | HQ6 |
| | G | PT7 | HT7 | PP7 | HP7 | HV7 | HQ7 |

(PRINTING APPARATUS B, PRINTING APPARATUS C, PRINTING APPARATUS D shown as additional sheets behind with same column structure)

FIG. 14

| INK TYPE | PRINTING CONDITIONS (MAINTENANCE MODES) | | | | | |
|---|---|---|---|---|---|---|
| | CLEANING | NOZZLE-MISSING INSPECTION | NOZZLE CLEANING | NOZZLE SURFACE INSPECTION | INK CIRCULATION | WARNING |
| A | CL10 | NI10 | NC10 | NV10 | IC10 | WN10 |
| B | CL20 | NI20 | NC20 | NV20 | IC20 | WN20 |
| C | CL30 | NI30 | NC30 | NV30 | IC30 | WN30 |
| D | CL40 | NI40 | NC40 | NV40 | IC40 | WN40 |
| E | CL50 | NI50 | NC50 | NV50 | IC50 | WN50 |
| F | CL60 | NI60 | NC60 | NV60 | IC60 | WN60 |
| G | CL70 | NI70 | NC70 | NV70 | IC70 | WN70 |

FIG. 15

| | | PRINTING CONDITIONS (MAINTENANCE MODES) | | | | | |
|---|---|---|---|---|---|---|---|
| PRINTING APPARATUS A | INK TYPE | CLEANING | NOZZLE-MISSING INSPECTION | NOZZLE CLEANING | NOZZLE SURFACE INSPECTION | INK CIRCULATION | WARNING |
| | A | CL10 | NI10 | NC10 | NV10 | IC10 | WN10 |
| | B | CL20 | NI20 | NC20 | NV20 | IC20 | WN20 |
| | C | CL30 | NI30 | NC30 | NV30 | IC30 | WN30 |
| | D | CL40 | NI40 | NC40 | NV40 | IC40 | WN40 |
| | E | CL50 | NI50 | NC50 | NV50 | IC50 | WN50 |
| | F | CL60 | NI60 | NC60 | NV60 | IC60 | WN60 |
| | G | CL70 | NI70 | NC70 | NV70 | IC70 | WN70 |

PRINTING CONDITION SETTING METHOD, PRINTING CONDITION SETTING SYSTEM

The present application is based on, and claims priority from JP Application Serial Number 2020-212192, filed Dec. 22, 2020, and JP Application Serial Number 2021-46968, filed Mar. 22, 2021, the disclosure of which are hereby incorporated by reference herein in its entirety.

BACKGROUND

1. Technical Field

The present disclosure relates to a printing condition setting method and a printing condition setting system.

2. Related Art

In the related art, as illustrated in JP-A-2005-231356, an ink identification method is described, which includes a step of irradiating a filled ink with light, a step of measuring light transmitted through or reflected by the ink in which amounts of a plurality of light having different wavelengths are measured with respect to one color of ink, and a step of identifying whether or not the filled ink is a predetermined ink based on the measured light amounts.

However, in the ink identification method described in JP-A-2005-231356, in order to identify as to whether or not the ink is a predetermined ink based on the measured value of the amount of light transmitted through or reflected by the ink, a threshold value for identification had to be set appropriately. That is, there is a problem that the ink cannot be accurately identified when the set threshold value is not set appropriately. Further, there is a problem that it is only possible to identify whether or not the ink is a predetermined ink, and it is not possible to set printing conditions corresponding to the identified ink.

SUMMARY

An ink identification method according to an aspect of the present disclosure is an ink identification method of generating a trained model by machine learning using training data in which at least one piece of ink characteristic data among absorbance, transmittance, and reflectance observed by irradiating an ink with light and a type of the ink or attribute information of the ink including the type of the ink are associated with each other, and identifying the type of ink corresponding to ink observation data based on output data of the trained model obtained by inputting at least one piece of ink observation data of absorbance, transmittance, and reflectance observed by irradiating the ink with light.

An ink identification system according to another aspect of the present disclosure includes an ink determination device as a trained model generated by machine learning using training data in which at least one piece of ink characteristic data among absorbance, transmittance, and reflectance observed by irradiating an ink with light and a type of the ink or attribute information of the ink including the type of the ink are associated with each other, and an ink identification section that identifies the type of ink corresponding to ink observation data based on output data of the ink determination device obtained by inputting at least one piece of ink observation data among absorbance, transmittance, and reflectance observed by irradiating the ink with light.

A printing condition setting method according to another aspect of the present disclosure is a printing condition setting method of setting printing conditions in a printing apparatus, including a learning step of performing machine learning by using ink physical characteristics and ink type information, a similarity score calculation step of calculating a similarity score indicating a similarity of a use ink used for printing in the printing apparatus with respect to learned ink learned in the learning step, and a printing condition setting step of setting the printing conditions according to the use ink based on the similarity score.

A printing condition setting system according to another aspect of the present disclosure sets printing conditions in a printing apparatus, and includes a learning section that performs machine learning by using ink physical characteristics and ink type information, a similarity score calculator that calculates a similarity score indicating a similarity of a use ink used for printing in the printing apparatus with respect to a learned ink learned in the learning section, and a printing condition setting section that sets the printing conditions according to the use ink based on the similarity score.

BRIEF DESCRIPTION OF THE DRAWINGS

FIG. 7 is an explanatory diagram illustrating an example of printing conditions (control parameters).

FIG. 13 is an explanatory diagram illustrating another example of the printing conditions (control parameters).

FIG. 14 is an explanatory diagram illustrating an example of the printing conditions (maintenance modes).

FIG. 15 is an explanatory diagram illustrating another example of the printing conditions (maintenance modes).

DESCRIPTION OF EXEMPLARY EMBODIMENTS

1. First Embodiment

Figure 1:
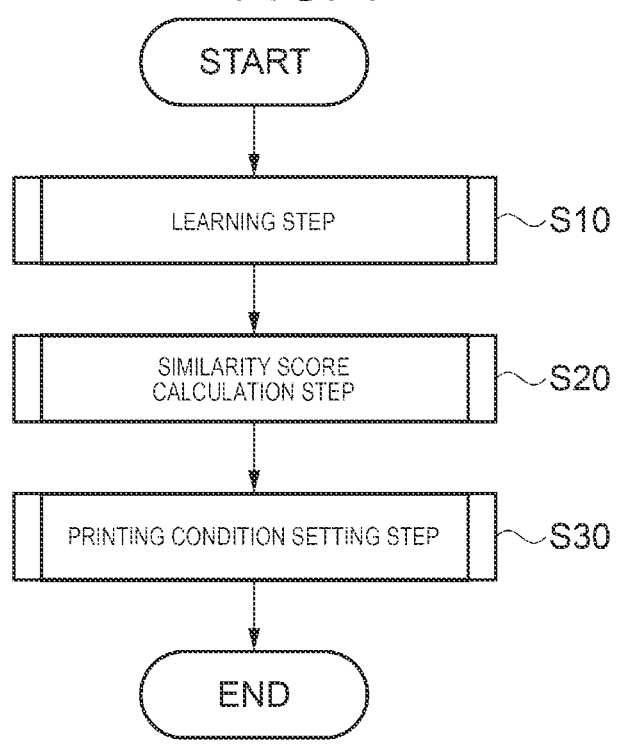
FIG. 1 is a flowchart illustrating a printing condition setting method.

As illustrated in FIG. 1, a printing condition setting method of the present embodiment is a printing condition setting method of setting printing conditions in a printing apparatus 2001 (FIG. 2), including a learning step (step S10) for performing machine learning by using ink physical characteristics and ink type information, a similarity score calculation step (step S20) for calculating a similarity score indicating a similarity of a use ink used for printing in the printing apparatus 2001 with respect to the learned ink learned in the learning step, and a printing condition setting step (step S30) for setting printing conditions according to the use ink based on the similarity score. If the use ink is a known ink that has already been learned, it is possible to omit the learning step (step S10) and start from the similarity score calculation step (step S20). Further, even if the use ink is unlearned, the similarity score calculation step (step S20) may be carried out first and the printing condition setting step (step S30) may be carried out according to the similarity score.

Figure 2:
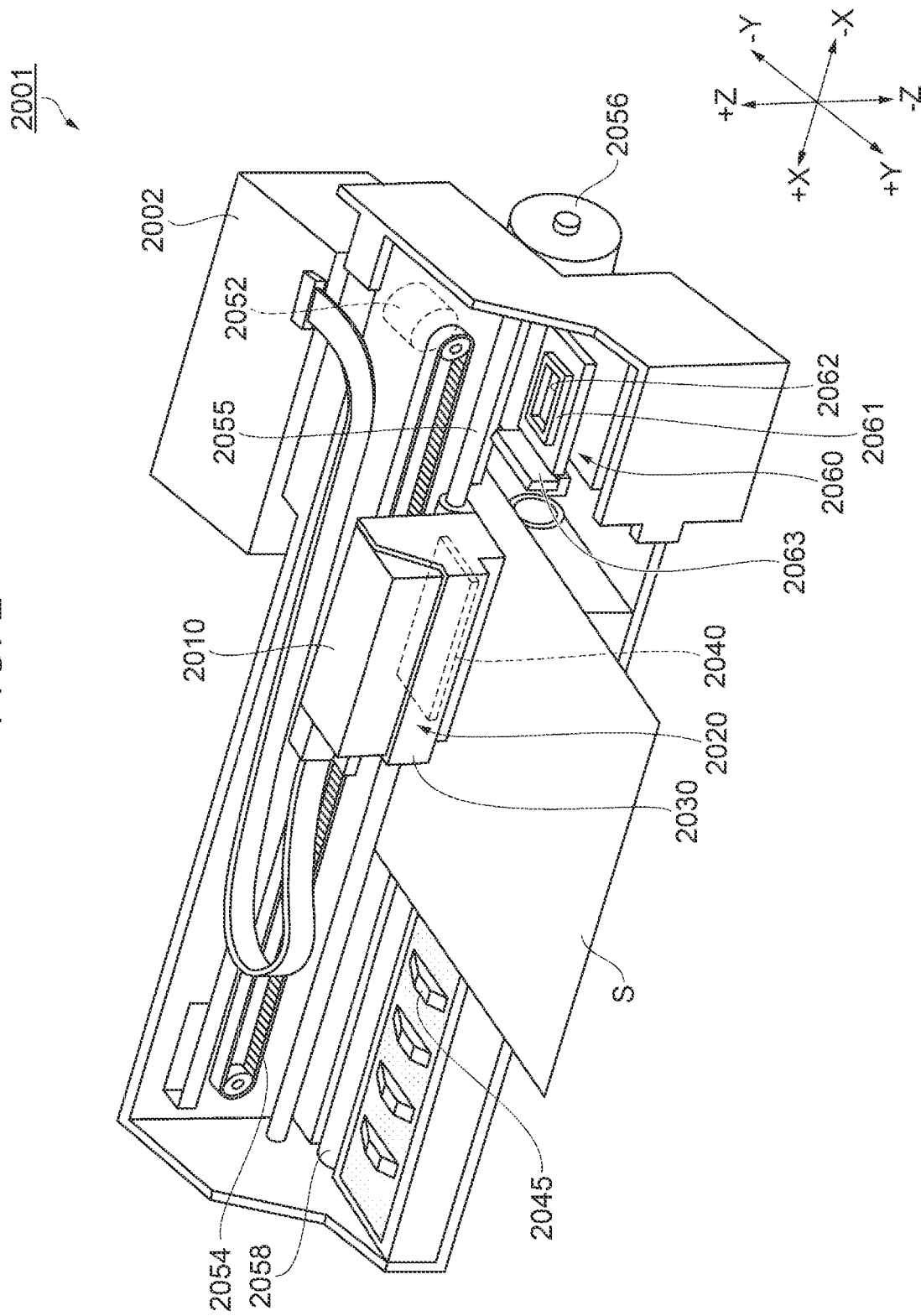
FIG. 2 is a schematic diagram illustrating a configuration example of a printing apparatus.

FIG. 2 is a schematic diagram illustrating a configuration example of the printing apparatus 2001. The printing apparatus 2001 is an ink jet printer capable of printing on media S (for example, paper).

The printing apparatus 2001 includes a carriage 2020. The carriage 2020 includes a mounting section 2030 and a head 2040.

The mounting section 2030 is configured to detachably attach a cartridge 2010 capable of containing ink as a liquid. The number of cartridges 2010 mounted on the mounting section 2030 may be singular or plural.

The cartridge 2010 is mounted on the mounting section 2030 in a state of being inserted into a liquid introduction needle (not illustrated) provided on the mounting section 2030. The ink contained in the cartridge 2010 is supplied to the head 2040 via the liquid introduction needle.

The head 2040 includes a plurality of nozzles (not illustrated), and ejects ink as droplets from each nozzle. The head 2040 includes, for example, a piezo element as an ink ejection mechanism, and ink is ejected from each nozzle by driving the piezo element. By ejecting ink from the head 2040 onto the media S supported by a platen 2045, characters, figures, images, and the like are printed on the media S.

The printing apparatus 2001 includes a main scanning feed mechanism and a sub-scanning feed mechanism that relatively move the carriage 2020 and the media S. The main scanning feed mechanism includes a carriage motor 2052 and a drive belt 2054. The carriage 2020 is fixed to the drive belt 2054. The carriage 2020 is guided by an erected guide rod 2055 and reciprocates in the direction along an X axis by the power of the carriage motor 2052. The sub-scanning feed mechanism includes a transport motor 2056 and a transport roller 2058, and transports the media S in a +Y direction by transmitting the power of the transport motor 2056 to the transport roller 2058. The direction in which the carriage 2020 reciprocates is a main scanning direction, and the direction in which the media S is transported is a sub-scanning direction.

The printing apparatus 2001 includes the platen 2045, and may have a configuration in which heating sections that heat the transported media S are disposed in the transport paths on the upstream and the downstream of the transport path of the platen 2045.

The printing apparatus 2001 includes a maintenance section 2060. The maintenance section 2060 performs various types of maintenance on the head 2040, for example. For example, the maintenance section 2060 includes a capping section 2061. The capping section 2061 includes a cap 2062 having a recessed section. The capping section 2061 is provided with an elevating mechanism including a drive motor (not illustrated), and is configured to move the cap 2062 in a direction along a Z axis. When the printing apparatus 2001 is not in operation, the maintenance section 2060 can prevent problems such as ink drying and nozzle clogging by capping the area where the nozzle is formed by bringing the cap 2062 into close contact with the head 2040.

Further, the maintenance section 2060 has various functions for cleaning the nozzle. For example, if ink is not ejected from a nozzle for a long time or foreign matter such as paper dust adheres to the nozzle, the nozzle may be clogged. When a nozzle is clogged, the ink is not ejected when the ink is supposed be ejected from the nozzle, and ink dots are not formed where the ink dots are supposed to be formed, that is, the nozzle-missing occurs. If the nozzle-missing occurs, the image quality will deteriorate. Therefore, the maintenance section 2060 forcibly ejects ink from the nozzle toward the recessed section of the cap 2062. That is, the nozzle is cleaned by flushing. Thereby, the ejection state of the nozzle can be restored to a good state.

In addition to the above, the maintenance section 2060 includes a wiping section 2063 that wipes the nozzle surface, a nozzle inspection section that inspects the state of the nozzle, and the like.

The printing apparatus 2001 includes a controller 2002. The carriage motor 2052, the transport motor 2056, the head 2040, the maintenance section 2060, and the like are controlled based on the control signal from the controller 2002.

Further, the printing apparatus 2001 includes, for example, a general-purpose interface such as a LAN interface or a USB interface, and can communicate with various external devices.

In the printing condition setting method of the present embodiment, machine learning is used to set printing conditions suitable for the use ink used in the printing apparatus 2001.

Further, in the ink identification method of the present embodiment, ink is identified by using an ink determination device as a trained model generated by performing machine learning using training data in which ink characteristic data observed by irradiating ink with light and an ink type or ink attribute information including the ink type are associated with each other. In identifying ink by using the ink determination device, the data observed by irradiating the ink to be identified with light is acquired as ink observation data, the acquired ink observation data is input to the ink determination device, and the type of ink is identified based on the output data of the ink determination device obtained in response to the input.

Hereinafter, a specific description will be given.

First, the learning step (step S10) will be described.

In the learning step (step S10), the ink determination device 2 (FIG. 3) is generated by using the trained model by performing machine learning using training data 4 in which ink characteristic data, which is the physical characteristics of the ink, and ink attribute information including ink type information are associated with each other.

Next, the generation processing of the ink determination device 2 will be specifically described.

The ink is the use ink used in the printing apparatus 2001. The apparatus in which the ink is used is not limited to the printing apparatus 2001, and the ink may be an ink that can be used in, for example, a drawing apparatus, a painting apparatus, a writing apparatus, and the like.

Identifying the type of ink means, for example, identifying the ink name or ink product number which is named or numbered by an ink maker.

The ink attribute information including ink type information is at least one of ink type, that is, ink name (manufacturer name) and ink product number, as well as ink color, kind of ink, ingredients contained in the ink, ink manufacturer, ink manufacturing area, and ink manufacturing time.

The kind of ink includes, for example, information such as water-based, oil-based, ultraviolet-curable, thermosetting, dye-based, and pigment-based.

The ink characteristic data is at least one of an absorbance A, a transmittance T %, and a reflectance R % observed by irradiating the ink with light.

Figure 3:
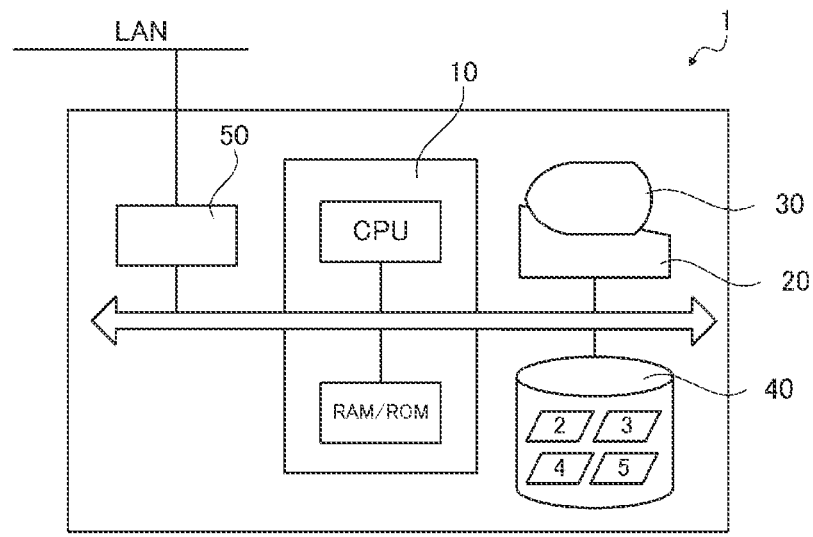
FIG. 3 is a block diagram illustrating a configuration of a machine learning apparatus.

The ink determination device 2 is generated by using a trained training model 5 in accordance with a learning program 3 in a machine learning apparatus 1 as a learning section illustrated in FIG. 3, using the training data 4. The ink determination device 2 is an identification program using a trained model obtained by training the training model 5 based on the training data 4 obtained up to a certain point in time, and is treated as the ink determination device 2 in a printing condition setting system 1000 (FIG. 6) described later when provided to the printing condition setting system 1000 via a communication section 50.

The machine learning apparatus 1 is a computer system and includes a machine learning section 10, an input section 20, a display section 30, a storage section 40, a communication section 50, and the like.

The machine learning section 10 includes a CPU, a RAM, and a ROM, and executes calculations necessary for machine learning according to the learning program 3 stored in the storage section 40. The machine learning section 10 may include a GPU and various processors designed for machine learning in order to perform machine learning.

The CPU means a central processing unit, the RAM means a random access memory, the ROM means a read-only memory, and the GPU means a graphics processing unit.

The input section 20 is an information input means as a user interface. Specifically, for example, a keyboard or a mouse pointer is used.

The display section 30 is an information display means as a user interface, and under the control of the machine learning section 10, for example, information input from the input section 20, calculation results of the machine learning section 10, and the like are displayed.

The storage section 40 is a rewritable storage medium such as a hard disk drive or a memory card, and stores the learning program 3 by which the machine learning section 10 operates, the training data 4 for performing machine learning, the training model 5, the ink determination device 2 using a trained model generated as a result of machine learning, and the like.

The communication section 50 includes, for example, a general-purpose interface such as a LAN interface or a USB interface, and exchanges information with an external electronic device.

In the present embodiment, the machine learning apparatus 1 performs machine learning by using the training model 5 using the ink characteristic data of various inks and the ink type information corresponding to the ink characteristic data as the training data 4. The ink type information is an ink type or ink attribute information including the ink type.

As the ink characteristic data, data such as the absorbance A, the transmittance T %, and the reflectance R % obtained by spectroscopic analysis of the ink is used because it is possible to take advantage of the fact that these characteristics differ depending on the ink type.

The absorbance A, transmittance T %, reflectance R % of the ink are obtained by evaluating the ink absorbed intensity, ink transmitted intensity, ink reflected intensity with respect to the intensity of the light applied to the ink of a sample by using a spectrophotometer.

When the intensity of the incident light is I0, the intensity of the transmitted light is I1, and the intensity of the reflected light is I2, each is calculated as follows.

Absorbance $A = \log(I0/I1)$

Transmittance $T\% = I1/I0 \times 100$

Reflectance $R\% = I2/I0 \times 100$

In the spectroscopic analysis, the wavelength of the light to be irradiated is divided into a predetermined wavelength range, for example, from the ultraviolet area to the infrared area by 10 nm, and sets of data of the absorbance A, transmittance T %, and reflectance R % in the wavelength range are acquired.

Figure 4:
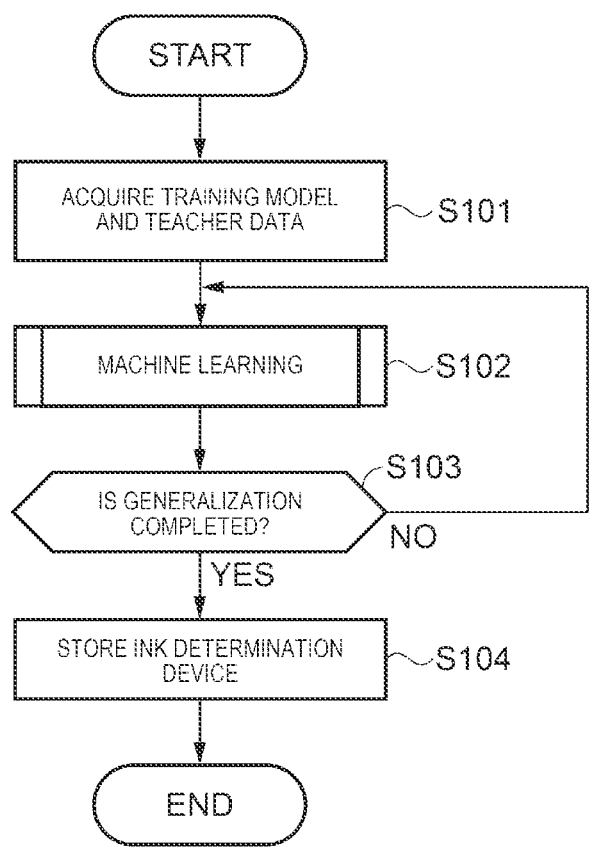
FIG. 4 is a flowchart illustrating a processing method of a learning step.

FIG. 4 is a flowchart illustrating a detailed processing method in the learning step (step S10). Specifically, FIG. 4 is a flowchart which illustrates the processing in which the machine learning section 10 performs machine learning and generates the ink determination device 2. By the time this processing is started, the ink characteristic data of a plurality of types of ink is collected as the training data 4 associated with the ink type or the ink attribute information including the ink type, and is stored in the storage section 40.

First, as step S101, the training model 5 and the training data 4 are acquired from the storage section 40.

Next, in steps S102 and S103, machine learning processing using the training model 5 is performed until generalization is completed. The determination in step S103 as to whether or not the generalization of the training model 5 is completed is performed by the threshold value determination of a correct answer rate of the output obtained by inputting the test data into the training model 5 up to that point.

By giving the training data 4 to the training model 5 and performing machine learning, the ink determination device 2 is generated by using the trained model for which generalization has been completed. In step S104, the generated ink determination device 2 is stored in the storage section 40.

Figure 5:
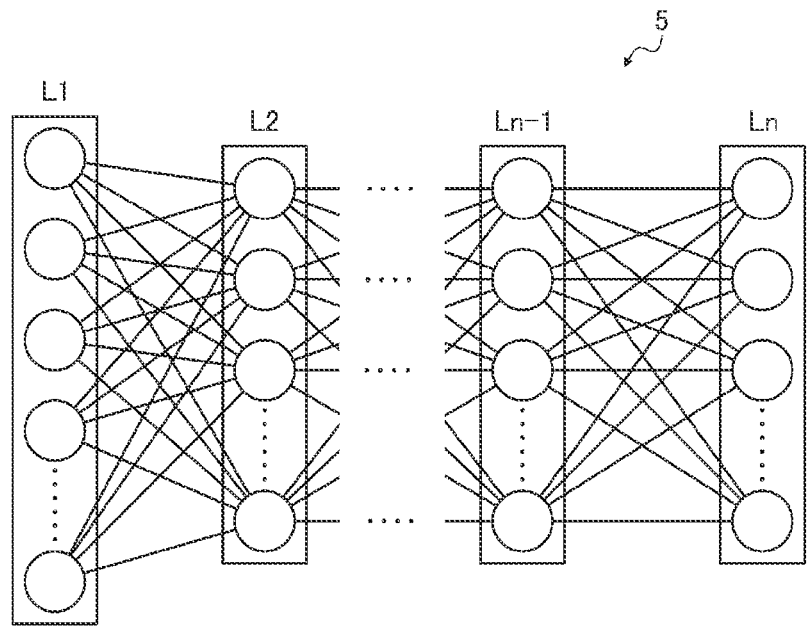
FIG. 5 is a schematic diagram illustrating an example of a training model used in the learning step.

The training model 5 for machine learning can be defined in various ways. FIG. 5 is a diagram schematically illustrating an example of the training model 5 used in the present embodiment. In the drawing, each layer of all n layers by CNN is illustrated by L1 to Ln, and the node of a normal neural network is illustrated by a white circle. In the present embodiment, CNN is used, but other models such as various neural networks such as a capsule network type and a vector neural network type may be used. CNN stands for convolutional neural network.

A first layer L1 is provided with a plurality of nodes for inputting ink characteristic data for each constant wavelength. In the present embodiment, for example, the reflectance R % for each constant wavelength indicated by spectral reflectance data is used as the input data to each node of the first layer L1 which is the input layer, and the final output data corresponding to the reflectance R % is output from a final output layer Ln.

Instead of or in addition to data of the reflectance R %, the transmittance T % and the absorbance A for each constant wavelength may be used. For example, when using three pieces of data including the absorbance A, the transmittance T %, and the reflectance R %, three training models 5 illustrated in FIG. 3 may be provided, and the results corresponding to the absorbance A, the transmittance T %, and the reflectance R % may be output from the final layer of each training model 5, and a final output layer Ln for combining these results for determination may be constructed and a final result may be output.

Further, in the ink attribute information, information that may affect the tendency of ink characteristic data determined according to the ink type may be input as input data from a newly provided node.

The output of each node of the first layer L1 is coupled to the next node of a second layer L2 with a predetermined weighting. This is the same from the second layer L2 to a (n−1)th layer Ln−1. By repeating the work of correcting the weighting between the nodes in each layer by using the training data 4, the learning proceeds, and the ink determination device 2 is generated by using the trained model.

Next, the configuration of the printing condition setting system 1000 will be described.

Figure 6:
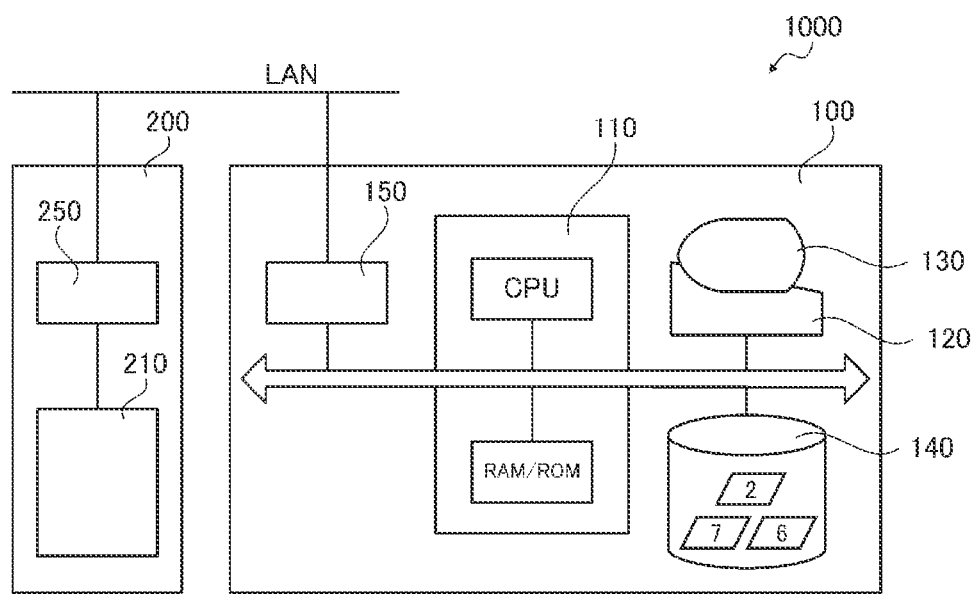
FIG. 6 is a block diagram illustrating a configuration of a printing condition setting system (ink identification system).

As illustrated in FIG. 6, the printing condition setting system 1000 includes a printing condition setting device 100 and a spectroscopic analyzer 200.

The printing condition setting device 100 includes a calculator 110 having a similarity score calculator that calculates a similarity score indicating a similarity of a use ink used for printing in the printing apparatus 2001 with respect to the learned ink learned in the machine learning apparatus 1 as a learning section, and a printing condition setting section that sets printing conditions according to the use ink based on the similarity score. That is, the printing condition setting device 100 is configured to execute each processing in a similarity score calculation step (step S20) and a printing condition setting step (step S30).

The printing condition setting device 100 is a computer system, and includes a calculator 110, an input section 120, a display section 130, a storage section 140, a communication section 150, and the like.

The calculator 110 includes a CPU, a RAM, and a ROM, and uses the ink determination device 2 stored in the storage section 140 to calculate a similarity score indicating a similarity of a use ink used for printing in the printing apparatus 2001 with respect to the learned ink. The calculator 110 may also function as an ink identification section that executes a calculation necessary for identifying the ink type. That is, when the calculator 110 also functions as an ink identification section, the printing condition setting device 100 functions as an ink identification device, and the printing condition setting system 1000 functions as an ink identification system. The use ink is analyzed by the spectroscopic analyzer 200.

In addition, the printing conditions according to the use ink are calculated (set) based on the similarity score.

The input section 120 is an information input means as a user interface. Specifically, for example, a keyboard or a mouse pointer is used.

The display section 130 is an information display means as a user interface, and displays, for example, the information input from the input section 120 and the calculation result of the calculator 110, such as the similarity score and the learning state, under the control of the calculator 110.

The storage section 140 is a rewritable storage medium such as a hard disk drive or a memory card.

The storage section 140 stores the ink determination device 2, printing condition data 6, various calculation programs 7 by which the calculator 110 operates, and the like.

As illustrated in FIG. 7, the printing condition data 6 of the present embodiment includes printing conditions that can be set for the printing apparatus 2001, and is table data in which each learned ink (ink type) and printing conditions corresponding to each learned ink are associated with each other. The printing conditions of the present embodiment include control parameters of the printing apparatus 2001. Specifically, the printing conditions include the temperature of the platen 2045, after-heater temperature for heating the transport path on the downstream of the transport path of the platen 2045, pre-heater temperature for heating the transport path on the upstream of the transport path of the platen 2045 as well as crimping pressure (nip pressure of the transport roller 2058), scanning speed of the head 2040, drive voltage of the head 2040, amount of heat (heating amount of the head 2040), and the like.

Further, the calculation programs 7 include a program for calculating the similarity score, a program for setting printing conditions, and the like.

The storage section 140 may be installed in an external server apparatus instead of the printing condition setting device 100. In this case, various data and the like are acquired via the communication section 150.

The communication section 150 includes, for example, a general-purpose interface such as a LAN interface or a USB interface, and can exchange information with an external device including the spectroscopic analyzer 200, the machine learning apparatus 1, and the printing apparatus 2001.

The spectroscopic analyzer 200 includes a spectroscopic analyzer 210, a communication section 250, and the like.

The spectroscopic analyzer 210 includes a light source, a spectroscope, a detector, and the like, and can acquire at least one ink observation data of the absorbance A, the transmittance T %, and the reflectance R % observed by irradiating the ink with light. It is preferable that the spectroscopic analyzer 210 can perform spectroscopic analysis with the same measurement specifications and analysis specifications as the spectrophotometer used when acquiring the above-mentioned ink characteristic data, that is, ink characteristic data as training data 4 in machine learning when generating the ink determination device 2 as a trained model.

The communication section 250 includes, for example, a general-purpose interface such as a LAN interface or a USB interface, and exchanges information with the printing condition setting device 100 or an external electronic device. The communication section 250 can transmit the ink observation data acquired by the spectroscopic analyzer 210 to the printing condition setting device 100.

That is, the printing condition setting system (ink identification system) 1000 uses the ink determination device 2 obtained by machine learning to identify the type of ink corresponding to the ink observation data based on the output data of the ink determination device 2 obtained by inputting at least one piece of ink observation data of the absorbance A, the transmittance T %, and the reflectance R % observed by irradiating the use ink used in the printing apparatus 2001 with light. Alternatively, based on the output data of the ink determination device 2 described above, the similarity score indicating the similarity of the use ink with respect to the learned ink is calculated, and the printing conditions are set according to the use ink based on the similarity score.

In the ink identification method of the present embodiment, in identifying an ink type by using the ink determination device 2 obtained by machine learning using the training data 4, the accuracy of the identification can be improved. Further, since the ink identification system of the present embodiment identifies an ink type based on the result of determination by using the ink determination device 2 obtained by machine learning, it is not necessary to set a threshold value for performing the identification, and it is not necessary to reset the threshold value for improving the accuracy of the identification, and therefore the identification can be performed with high accuracy.

The printing condition setting device 100 may have a machine learning function. That is, the configuration may include the machine learning apparatus 1. Specifically, the printing condition setting device 100 may have a function of setting the acquired ink determination device 2 as the training model 5, the ink observation data newly obtained from the spectroscopic analyzer 200 and information on the correct ink type corresponding to the ink observation data as new training data 4, further performing machine learning, and refining the ink determination device 2.

Next, the similarity score calculation step (step S20) using the printing condition setting system 1000 will be described.

Figures 8, 9A, 9B:
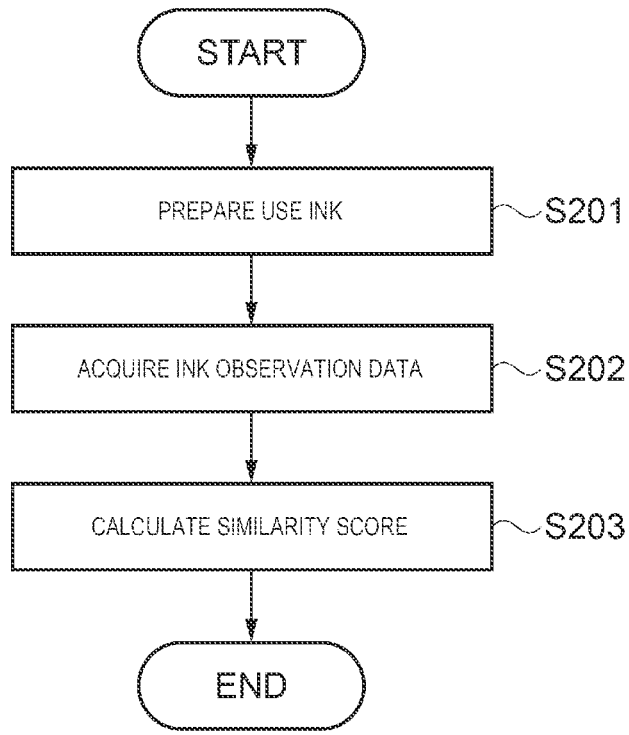
FIG. 8 is a flowchart illustrating a processing method of a similarity score calculation step.
FIG. 9A is an explanatory diagram illustrating an example of a calculation result of a similarity score in the similarity score calculation step.
FIG. 9B is an explanatory diagram illustrating another example of the calculation result of the similarity score in the similarity score calculation step.

FIG. 8 is a flowchart illustrating a detailed processing method in the similarity score calculation step (step S20).

In starting the processing of calculating the similarity score, the printing condition setting device 100 includes an ink determination device 2 using the trained model in the storage section 140. That is, in the present embodiment, the ink determination device 2 is generated by machine learning using the training data 4 in which at least one piece of ink characteristic data of the absorbance A, the transmittance T %, and the reflectance R % observed by irradiating the ink with light in advance and the ink type or the ink attribute information including the ink type are associated with each other.

First, in step S201, a sample of use ink used in the printing apparatus 2001 is prepared. Specifically, the sample of the use ink is set to be available for analysis in the spectroscopic analyzer 210.

Next, in step S202, the spectroscopic analyzer 210 performs spectroscopic analysis of the ink sample and acquires ink observation data. In the spectroscopic analysis, the wavelength of the light to be irradiated is divided into a predetermined wavelength range, for example, from the ultraviolet area to the infrared area by 10 nm, and sets of data of the absorbance A, transmittance T %, and reflectance R % in the wavelength range are acquired.

The spectroscopic analyzer 210 transmits the acquired ink observation data to the printing condition setting device 100 via the communication section 250.

Next, in step S203, the printing condition setting device 100 that has received the ink observation data inputs the ink observation data to the ink determination device 2 in the calculator 110, and calculates the similarity score based on the output data of the ink determination device 2. When functioning as an ink identification section, in step S203, the calculator 110 identifies the ink type corresponding to the ink observation data based on the output data of the ink determination device 2. The identification result of ink type is displayed on the display section 130.

The similarity score is calculated according to the following Equation 1 by using a color difference (ΔE) between the learned ink types.

$$\text{Similarity Score} = 1.0 - \Delta E / \text{Range} \qquad \text{Equation 1}$$

However, when the similarity score is <−1.0, the similarity score is −1.0. Range is a value that can be adjusted as appropriate.

Here, the similarity score is calculated with a value of −1.0 or higher and 1.0 or less. Then, it is determined that the closer the similarity score is to 1.0, the higher the similarity of the use ink with respect to the learned ink is. On the other hand, it is determined that the closer the similarity score is to −1.0, the lower the similarity of the use ink with respect to the learned ink is.

FIG. 9A illustrates an example of the calculation result of the similarity score in a certain use ink.

In the example of FIG. 9A, the similarity score of the use ink with respect to each of the 14 types of learned ink (ink type A to ink type N) is illustrated. For example, the similarity score of the use ink with respect to the ink type A is 0.1, and the similarity score of the use ink with respect to the ink type G is −0.3.

Among the 14 types of ink, the similarity score of the use ink with respect to the ink type B is 0.9, which is the highest similarity score. On the other hand, the similarity score of the use ink with respect to the ink type F is −0.6, which is the lowest similarity score.

Further, FIG. 9B illustrates an example of the calculation result of the similarity score in other use inks.

In the example of FIG. 9B, the similarity score of the use ink with respect to the ink type J is 0.6, which is the highest similarity score. On the other hand, the similarity score of the use ink with respect to the ink type C is −1.0, which is the lowest similarity score.

The calculation result of the similarity score can be displayed on the display section 130. When displaying on the display section 130, as illustrated in FIGS. 9A and 9B, the ink types may be displayed in a list, or the ink types may be rearranged and displayed in descending order of similarity score. Further, the ink type having the highest similarity score may be displayed in bold characters. In this way, a user can easily check the similarity score of the use inks.

Next, the printing condition setting step (step S30) using the printing condition setting system 1000 will be described.

Figure 10:
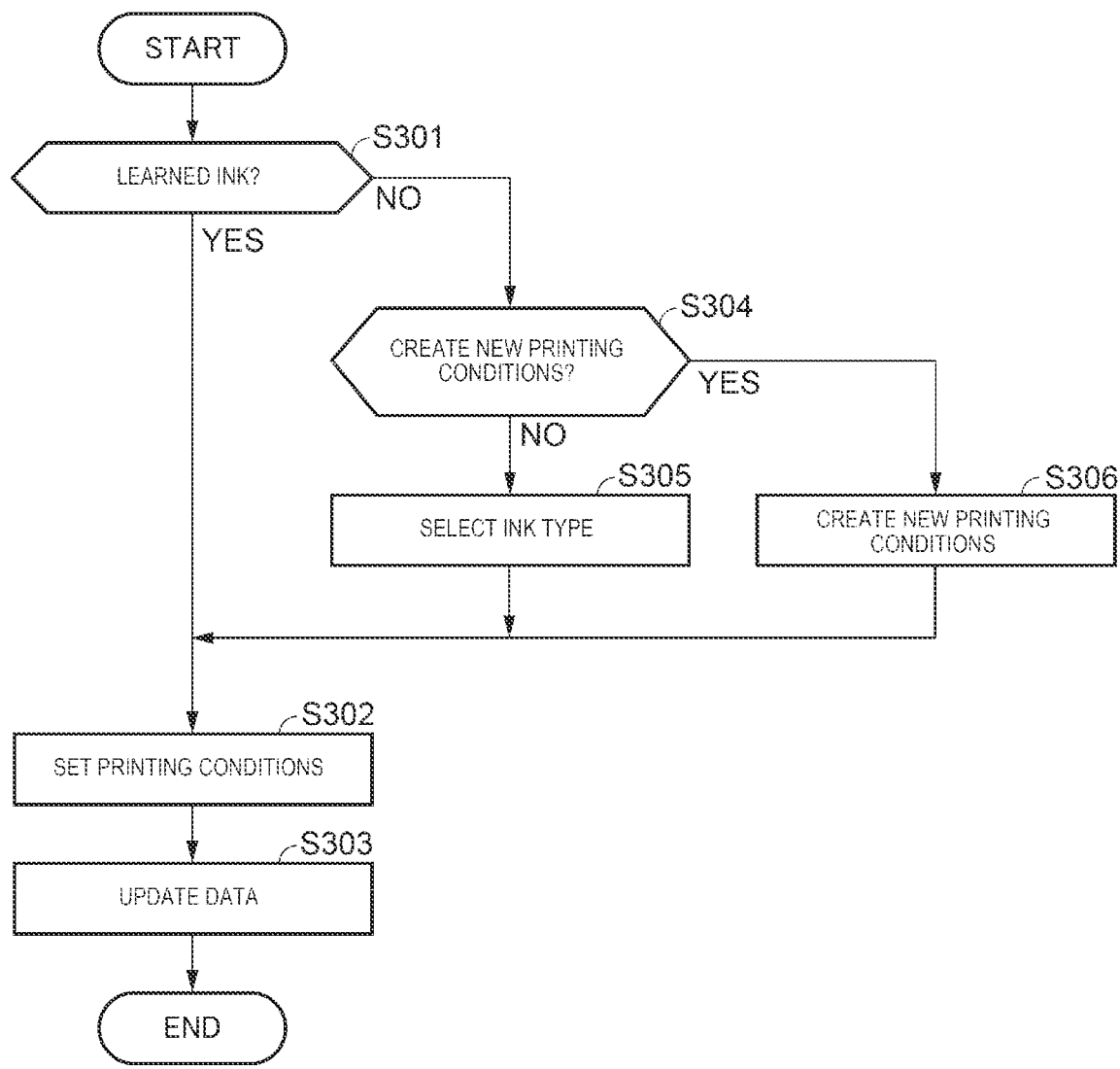
FIG. 10 is a flowchart illustrating a processing method of a printing condition setting step.

FIG. 10 is a flowchart illustrating a detailed processing method in the printing condition setting step (step S30).

First, in step S301, the calculator 110 determines whether or not the use ink is already learned ink. In other words, it is determined whether or not the charged use ink is a known ink type.

Whether or not the use ink is a learned ink is determined based on the calculation result of the similarity score. That is, in step S301, the learning state of the use ink is determined (corresponding to the learning state determination step). Specifically, when the similarity score is equal to or higher than the threshold value, it is determined that the ink is a learned ink (YES), and when the similarity score is less than the threshold value, it is determined that the ink is not a learned ink (the ink is an unlearned ink) (NO). The threshold value of similarity score in the present embodiment is 0.9.

Therefore, in the present embodiment, when the similarity score is 0.9 or more, it is determined that the ink is a learned ink (YES), and the processing proceeds to step S302. On the other hand, when the similarity score is less than 0.9, it is determined that the ink is not a learned ink (NO), and the processing proceeds to step S304. Thereby, it is possible to easily determine the learning state of whether the use ink is a learned ink or an unlearned ink.

In step S302, the calculator 110 sets the printing conditions according to the use ink based on the similarity score. Further, the calculator 110 causes the display section 130 to display the determination result of the learning state.

Figure 11:
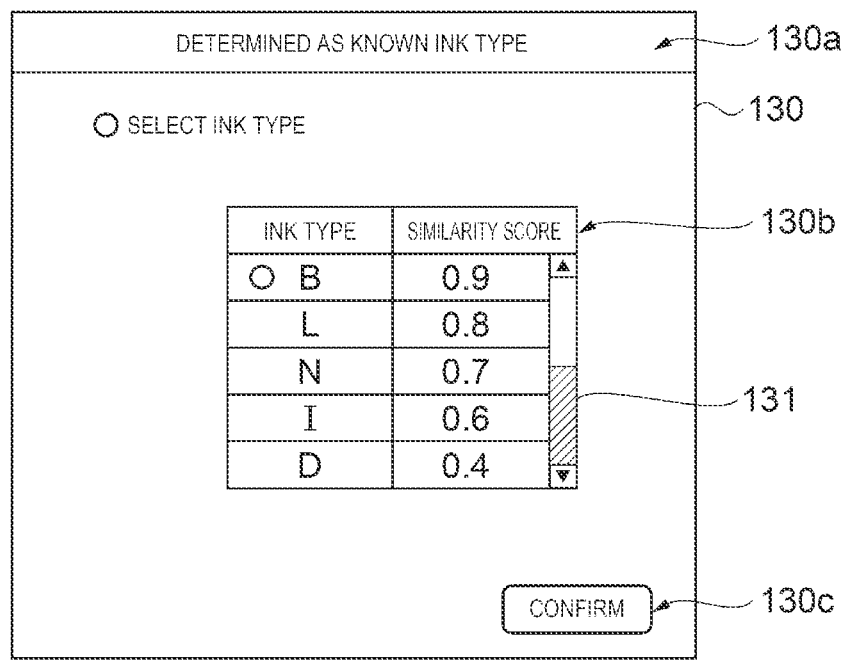
FIG. 11 is an explanatory diagram illustrating an example of a method of displaying a determination result of a learning state.

FIG. 11 illustrates a display method when it is determined that the use ink is a learned ink. FIG. 11 is a display example based on the calculation result of the similarity score illustrated in FIG. 9A.

As illustrated in FIG. 11, a determination result ("determined as a known ink type") is displayed on an upper section 130a of the display section 130. In this way, it is easy to see that the use ink is a learned ink.

The calculation result of the similarity score is displayed on a central section 130b of the display section 130. As a display method, for example, all the calculation results of the similarity score are displayed. In this case, the ink types may be displayed in order of higher similarity scores. When the size of the display section 130 makes it impossible to display all the calculation results of the similarity score at one time, a scroll bar 131 can be provided to display all the calculation results. Further, as another display method, only ink types having a similarity score of 0.9 or higher (threshold value or higher) may be displayed. In addition, a radio button is displayed for ink types having a similarity score of 0.9 or higher (threshold value or higher).

A printing condition setting button (confirm button) is displayed on a lower section 130c of the display section 130.

The user selects the ink type with the radio button and presses the confirm button.

The calculator 110 sets the printing conditions (control parameters (FIG. 7)) corresponding to the ink type selected from the printing condition data 6.

When various data such as the printing condition data 6 is stored in an external server apparatus, necessary data is acquired from the external server apparatus via the communication section 150.

Thereby, it is possible to provide printing conditions (control parameters) suitable for the use ink according to the similarity score.

Next, in step S303, the calculator 110 updates the data. Specifically, the information on the use ink at this time is updated. Further, the characteristic data of the use ink at this time and the attribute information of the ink are associated with each other, and the ink determination device 2 is updated.

Next, a case where it is determined in step S301 that the ink is not a learned ink, that is, the learning state of the use ink is determined to be unlearned ink (NO), and the processing proceeds to step S304 will be described.

In step S304, the user determines whether or not to create new printing conditions. When no new printing condition is created, the processing proceeds to step S305, and when a new printing condition is created, the processing proceeds to step S306.

Figure 12A:
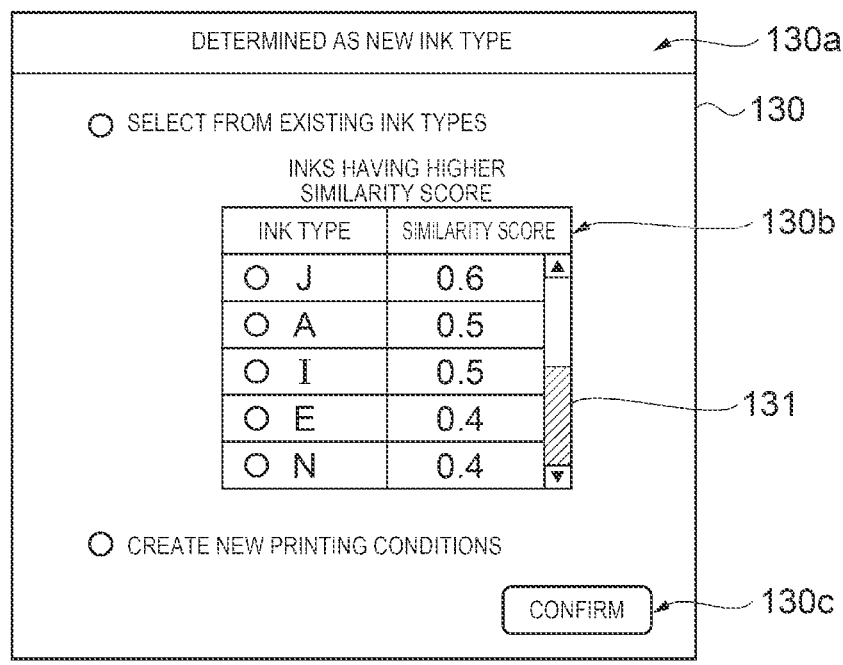
FIG. 12A is an explanatory diagram illustrating an example of the method of displaying the determination result of the learning state.
Figure 12B:
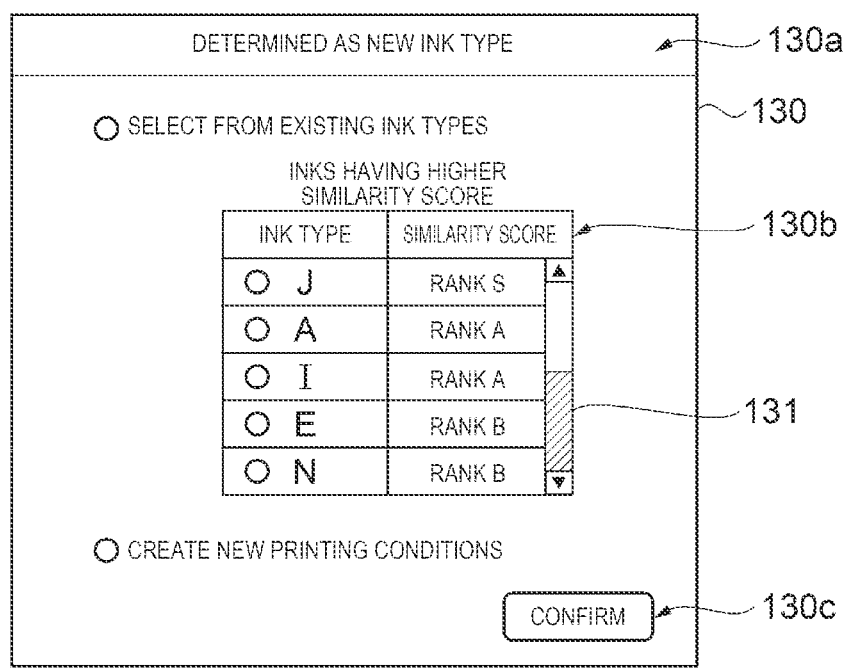
FIG. 12B is an explanatory diagram illustrating another example of the method of displaying the determination result of the learning state.

The calculator 110 causes the display section 130 to display the determination result of the learning state. FIGS. 12A and 12B illustrate a display method in which it is determined that the use ink is an unlearned ink. FIG. 12A is a display example based on the calculation result of the similarity score illustrated in FIG. 9B.

As illustrated in FIG. 12A, the determination result ("determined as a new ink type") is displayed on the upper section 130a of the display section 130. In this way, it is easy to see that the use ink is an unlearned ink.

The calculation result of the similarity score is displayed on the central section 130b of the display section 130. As a display method, for example, all the calculation results of the similarity score are displayed. In this case, the ink types may be displayed in order of higher similarity scores. When the size of the display section 130 makes it impossible to display all the calculation results of the similarity score at one time, the scroll bar 131 can be provided to display all the calculation results. Further, as another display method, the similarity score may be displayed in ranks in descending order of ink types having a higher similarity score as illustrated in FIG. 12B instead of numerical values. In the example of FIG. 12B, rank S, rank A, rank B, . . . are displayed in this order from the one having the highest similarity score to the one having the lowest similarity score.

In addition, a radio button is displayed for each ink type displayed.

Further, "select from existing ink types" and "create new printing conditions" are displayed on the central section 130b and the lower section 130c of the display section 130. A radio button that can be selected is displayed in each display section of "select from existing ink types" and "create new printing conditions".

Further, a confirm button is displayed on the central section 130b and the lower section 130c of the display section 130.

When no new printing condition is created in step S304, the processing proceeds to step S305. In this case, the user selects "select from existing ink types" on the display section 130 and an ink type. These selections are made by turning on the radio buttons. Here, the learned ink (ink type) according to the similarity score is selected. Specifically, when selecting an ink type, it is preferable to select the ink type having the highest similarity score based on the calculation result of the similarity score. For example, in the example of FIG. 12A, the ink type J is selected. Then, the user presses the confirm button. As a result, the processing proceeds to step S302, and the printing conditions corresponding to the selected ink type are set.

That is, even when the use ink is an unlearned ink, by setting the printing conditions corresponding to the ink type having the highest similarity score, the printing conditions (control parameters) can be provided earlier than in the case of creating completely new printing conditions.

On the other hand, when new printing conditions are created in step S304, the processing proceeds to step S306. In this case, the user selects "create new printing conditions" on the display section 130 and selects an ink type. These selections are made by turning on the radio buttons. When selecting an ink type, it is preferable to select the ink type having the highest similarity score based on the calculation result of the similarity score. For example, in the example of FIG. 12A, the ink type J is selected. Then, the user presses the confirm button.

In step S306, new printing conditions are created (corresponding to the printing condition creation step).

In creating printing conditions, each control parameter is adjusted based on the printing conditions corresponding to the selected ink type.

For example, regarding the parameter of the head scanning speed, the ink is ejected toward the media S while the head 2040 scans under a plurality of speed conditions. Then, a speed condition in which the shape of the ink dots formed on the media S is close to a perfect circle is set as a parameter value of the head scanning speed.

As for the parameters of the platen temperature and the heater temperature, the temperature at which the ink is fixed in the media S is set as each parameter value of the platen temperature and the heater temperature.

When an ink type having a low similarity score is selected, in consideration of the influence on the printing apparatus 2001, the conditions in the mechanical mechanism such as the main scanning feed mechanism and the sub-scanning feed mechanism of the printing apparatus 2001 and the ink supply mechanism start from the minimum value that each mechanism can take. For example, the heaters such as the platen 2045 and each heater are adjusted in the off state. Further, the scanning operation of the head 2040 is set to the lowest speed. Also, the operating area of the head 2040 is minimized. Thereby, the load on the printing apparatus 2001 can be reduced.

In this way, printing conditions for an unlearned ink are created. The newly created printing conditions are stored in the storage section 140.

Next, the processing proceeds to step S302, and the calculator 110 sets newly created printing conditions for the use ink (unlearned ink).

Next, in step S303, the calculator 110 updates the data. Specifically, the information on the use ink (unlearned ink) is updated. Further, the characteristic data of the use ink at this time (unlearned ink) and the attribute information of the ink are associated with each other, and the ink determination device 2 is updated. In addition, the printing condition data 6 is updated. As a result, from the next time, machine learning will be executed for the unlearned ink at this time as a learned ink.

As described above, even when the use ink is an unlearned ink, by creating printing conditions based on the printing conditions corresponding to the ink type having the highest similarity score, the printing conditions (control parameters) can be provided earlier than in the case of creating completely new printing conditions.

The method of setting printing conditions (control parameters) for one printing apparatus 2001 has been described in the present embodiment, but control parameters can be set for a plurality of printing apparatuses 2001. In this case, as illustrated in FIG. 13, as the printing condition data 6, table data is formed, in which a learned ink (ink type) and control parameters are associated for each printing apparatus 2001. In this way, appropriate control parameters can be set for different printing apparatuses 2001.

2. Second Embodiment

Next, a second embodiment will be described. Specifically, in the first embodiment, the control parameters as the printing conditions are set for the printing apparatus 2001, but in the present embodiment, a mode for setting maintenance modes as printing conditions for the printing apparatus 2001 will be described. The same configurations as those in the first embodiment are designated by the same reference numerals, and duplicate description will be omitted.

The storage section 140 of the printing condition setting device 100 stores the ink determination device 2, the printing condition data 6, the various calculation programs 7 by which the calculator 110 operates, and the like.

As illustrated in FIG. 14, the printing condition data 6 in the printing apparatus 2001 of the present embodiment is table data in which each learned ink (ink type) and maintenance modes corresponding to each learned ink are associated with each other. Specifically, the printing condition data 6 includes the cleaning frequency of the head 2040, the inspection frequency for nozzles, the automatic cleaning frequency of the nozzle surface, the inspection frequency of the nozzle surface, the warning frequency, the ink circulation frequency, and the like.

In the present embodiment, the maintenance modes are set according to the use ink, based on the similarity score. Therefore, since the learning step (step S10) and the similarity score calculation step (step S20) are the same as those of the first embodiment, the description thereof will be omitted, and the printing condition setting step (step S30) of the present embodiment will be described with reference to FIG. 10.

In step S301, the calculator 110 determines whether or not the use ink is a learned ink.

Whether or not the use ink is a learned ink is determined by the similarity score. Specifically, when the similarity score is equal to or higher than the threshold value, it is determined that the ink is a learned ink (YES), and when the similarity score is less than the threshold value, it is determined that the ink is not a learned ink (the ink is an unlearned ink) (NO). The threshold value of similarity score in the present embodiment is 0.9.

Therefore, in the present embodiment, when the similarity score is 0.9 or more, it is determined that the ink is a learned ink (YES), and the processing proceeds to step S302. On the other hand, when the similarity score is less than 0.9, it is determined that the ink is not a learned ink (NO), and the processing proceeds to step S304.

In step S302, the calculator 110 sets the printing conditions according to the use ink based on the similarity score. Further, the calculator 110 causes the display section 130 to display the determination result of the learning state (FIG. 11). Since the description of FIG. 11 is the same as that of the first embodiment, the description thereof will be omitted. The user selects a radio button and presses the confirm button. As a result, the calculator 110 sets the maintenance modes (FIG. 14) corresponding to the ink type selected from the printing condition data 6.

When various data such as the printing condition data 6 is stored in an external server apparatus, necessary data is acquired from the external server apparatus via the communication section 150.

Thereby, it is possible to provide printing conditions (maintenance modes) suitable for the use ink according to the similarity score.

Next, in step S303, the calculator 110 updates the data. Specifically, the information on the use ink at this time is updated. Further, the characteristic data of the use ink at this time and the attribute information of the ink are associated with each other, and the ink determination device 2 is updated. In addition, the printing condition data 6 is updated.

Next, a case where it is determined in step S301 that the ink is not a learned ink, that is, the learning state of the use ink is determined to be unlearned ink (NO), and the processing proceeds to step S304 will be described.

In step S304, the user determines whether or not to create new printing conditions. When no new printing condition is created, the processing proceeds to step S305, and when a new printing condition is created, the processing proceeds to step S306.

The calculator 110 causes the display section 130 to display the determination result of the learning state. FIG. 12A illustrates a display method in which it is determined that the use ink is an unlearned ink. Since the description of FIG. 12A is the same as that of the first embodiment, the description thereof will be omitted.

When new printing conditions are not created in step S304, the processing proceeds to step S305, and the user selects "select from existing ink types" on the display section 130 and an ink type. These selections are made by turning on the radio buttons. When selecting an ink type, it is preferable to select the ink type having the highest similarity score based on the calculation result of the similarity score. For example, in the example of FIG. 12A, the ink type J is selected. Then, the user presses the confirm button. As a result, the processing proceeds to step S302, and the maintenance modes corresponding to the selected ink type is set.

That is, even when the use ink is an unlearned ink, by setting the maintenance modes corresponding to the ink type having the highest similarity score, maintenance modes can be provided earlier than in the case of creating completely new maintenance modes.

On the other hand, when new printing conditions (maintenance modes) are created in step S304, the processing proceeds to step S306, and the user selects "create new printing conditions" on the display section 130 and selects an ink type. These selections are made by turning on the radio buttons. When selecting an ink type, it is preferable to select the ink type having the highest similarity score based on the calculation result of the similarity score. For example, in the example of FIG. 12A, the ink type J is selected. Then, the user presses the confirm button.

In step S306, new maintenance modes are created (corresponding to the printing condition creation step).

In creating maintenance modes, each parameter is adjusted based on the maintenance modes corresponding to the selected ink type.

For example, regarding the cleaning frequency, the number of output dots at the time when the head 2040 is actually driven to print on the media S and a nozzle—missing is detected is used as the cleaning frequency.

When an ink type having a low similarity score is selected, the frequency of each parameter is unknown, and therefore it is preferable to set the value of the maximum frequency as an initial value.

In this way, maintenance modes for an unlearned ink are created. The newly created maintenance modes are stored in the storage section 140.

Next, the processing proceeds to step S302, and the calculator 110 sets the newly created printing conditions (maintenance modes) for the use ink (unlearned ink).

Next, in step S303, the calculator 110 updates the data. Specifically, the information on the use ink (unlearned ink) is updated. Further, the characteristic data of the use ink at this time (unlearned ink) and the attribute information of the ink are associated with each other, and the ink determination device 2 is updated. In addition, the printing condition data 6 is updated. As a result, from the next time, machine learning will be executed for the unlearned ink at this time as a learned ink.

As described above, even when the use ink is an unlearned ink, by creating maintenance modes based on the printing conditions corresponding to the ink type having the highest similarity score, the maintenance modes can be provided earlier than in the case of creating completely new maintenance modes.

The method of setting printing conditions (maintenance modes) for one printing apparatus 2001 has been described in the present embodiment, but maintenance modes can be set for a plurality of printing apparatuses 2001. In this case, as illustrated in FIG. 15, as the printing condition data 6, table data is formed, in which a learned ink (ink type) and maintenance modes are associated for each printing apparatus 2001. In this way, appropriate maintenance modes can be set for different printing apparatuses 2001.

Further, a printing mode may be set as printing conditions for the printing apparatus 2001. The printing mode includes at least one of printing resolution, number of passes, halftone type, ink dot arrangement, and ink dot size.

What is claimed is:

1. A printing condition setting method of setting printing conditions in a printing apparatus, the method comprising:
   a learning step of performing machine learning by using ink physical characteristics and ink type information;
   a similarity score calculation step of calculating a similarity score indicating a similarity of a use ink used for printing in the printing apparatus with respect to a learned ink learned in the learning step; and
   a printing condition setting step of setting the printing conditions according to the use ink based on the similarity score.

2. The printing condition setting method according to claim 1, wherein
   the printing conditions are control parameters of the printing apparatus.

3. The printing condition setting method according to claim 1, wherein
   the printing conditions are maintenance modes of the printing apparatus.

4. The printing condition setting method according to claim 1, further comprising:
   a learning state determination step of determining a learning state of the use ink based on the similarity score.

5. The printing condition setting method according to claim 4, wherein
   when it is determined in the learning state determination step that the learning state of the use ink is an unlearned ink, the learned ink corresponding to the similarity score of the use ink is selected, and the printing conditions of the selected learned ink are set in the printing condition setting step.

6. The printing condition setting method according to claim 4, further comprising:
   when it is determined in the learning state determination step that the learning state of the use ink is an unlearned ink, a printing condition creation step of newly creating the printing conditions.

7. The printing condition setting method according to claim 1, wherein
   the similarity score is displayed in the similarity score calculation step.

8. A printing condition setting system that sets printing conditions in a printing apparatus, the system comprising:
   a learning section that performs machine learning by using ink physical characteristics and ink type information;
   a similarity score calculator that calculates a similarity score indicating a similarity of a use ink used for printing in the printing apparatus with respect to a learned ink learned in the learning section; and
   a printing condition setting section that sets the printing conditions according to the use ink based on the similarity score.

* * * * *